Sept. 19, 1950
H. F. MAYNES
2,523,133
FISHING REEL
Filed July 23, 1946
3 Sheets-Sheet 1
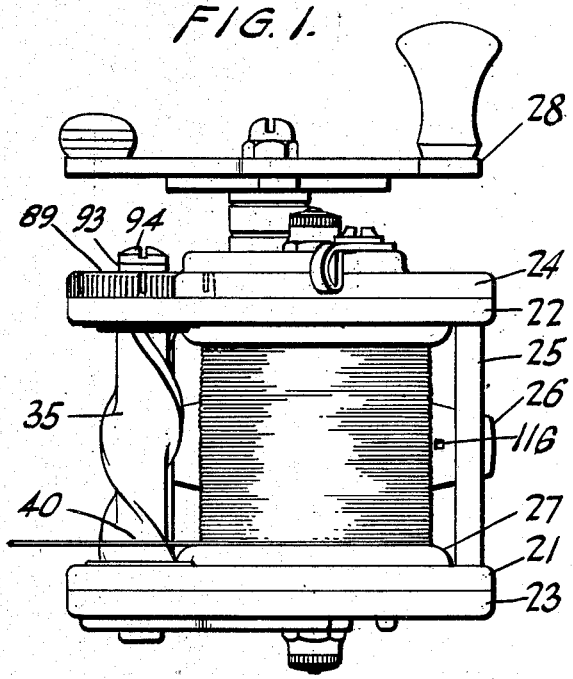
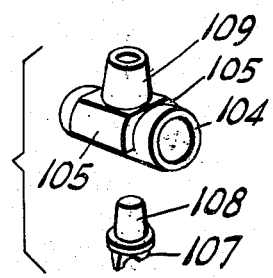
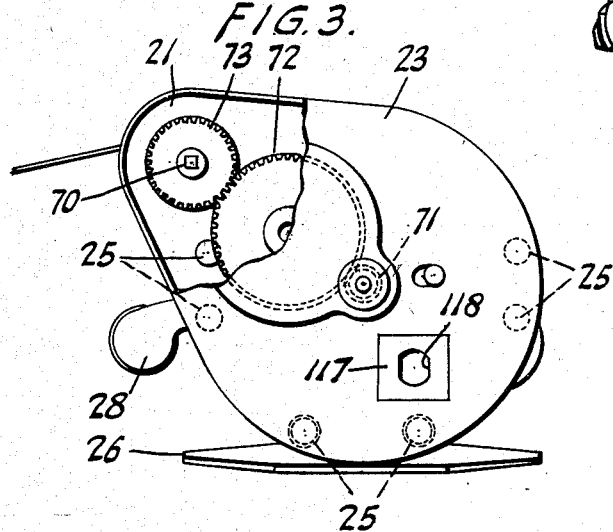
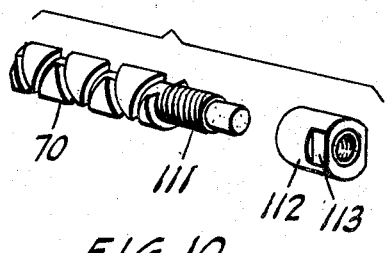
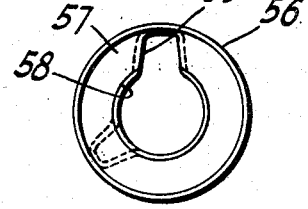
INVENTOR
HYLA F. MAYNES,
BY
Bean, Brooks, Buckley & Bean.
ATTORNEYS Sept. 19, 1950        H. F. MAYNES        2,523,133
FISHING REEL
Filed July 23, 1946                                    3 Sheets-Sheet 2
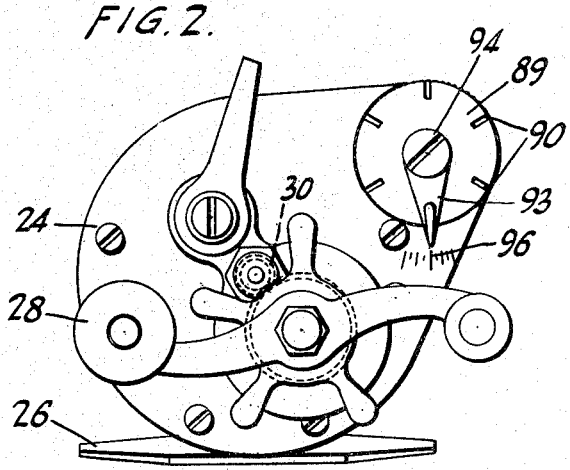
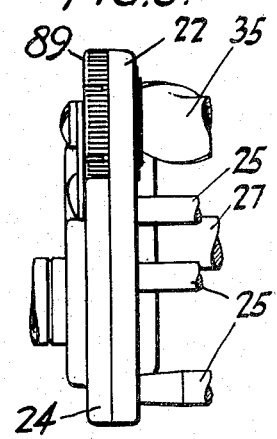
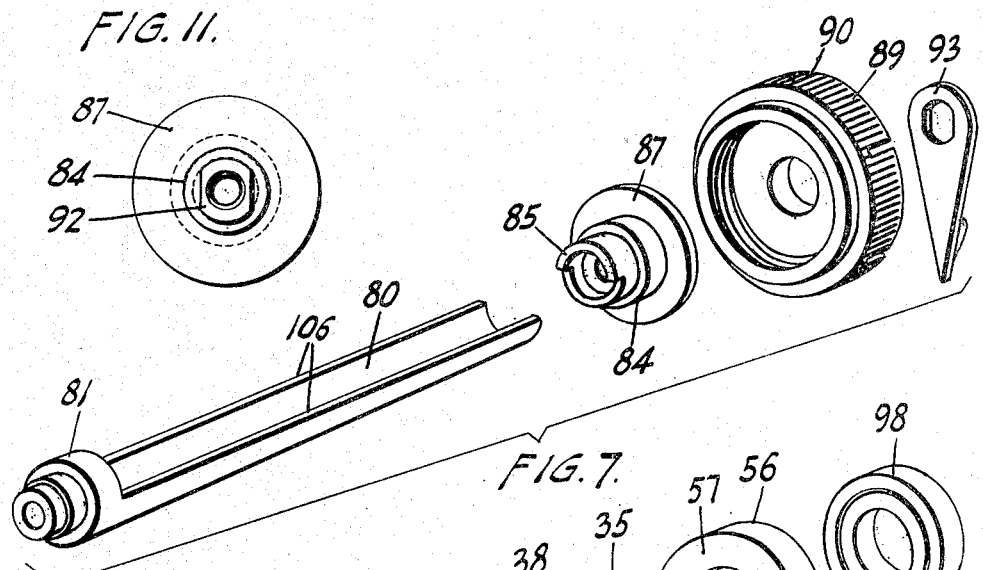
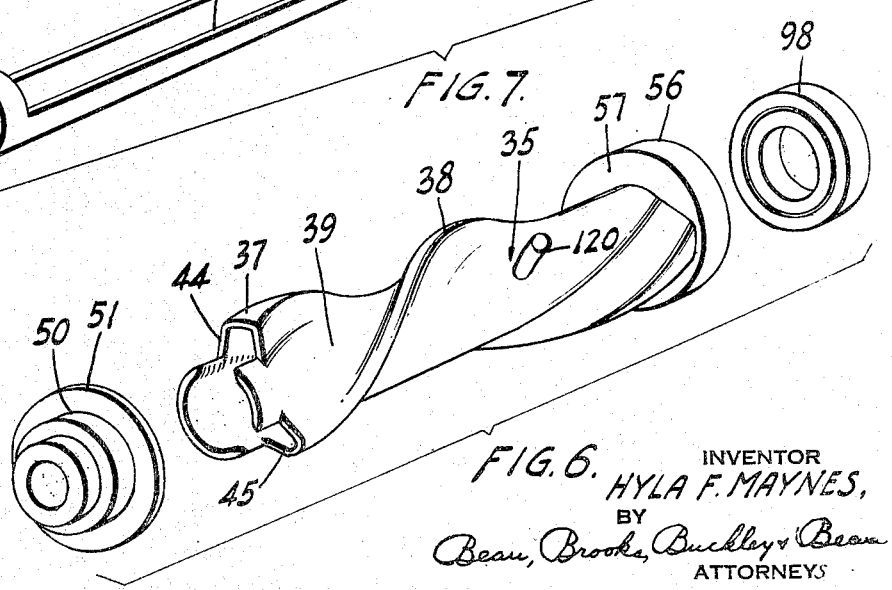
INVENTOR
HYLA F. MAYNES,
BY
Beau, Brooks, Buckley & Beau
ATTORNEYS

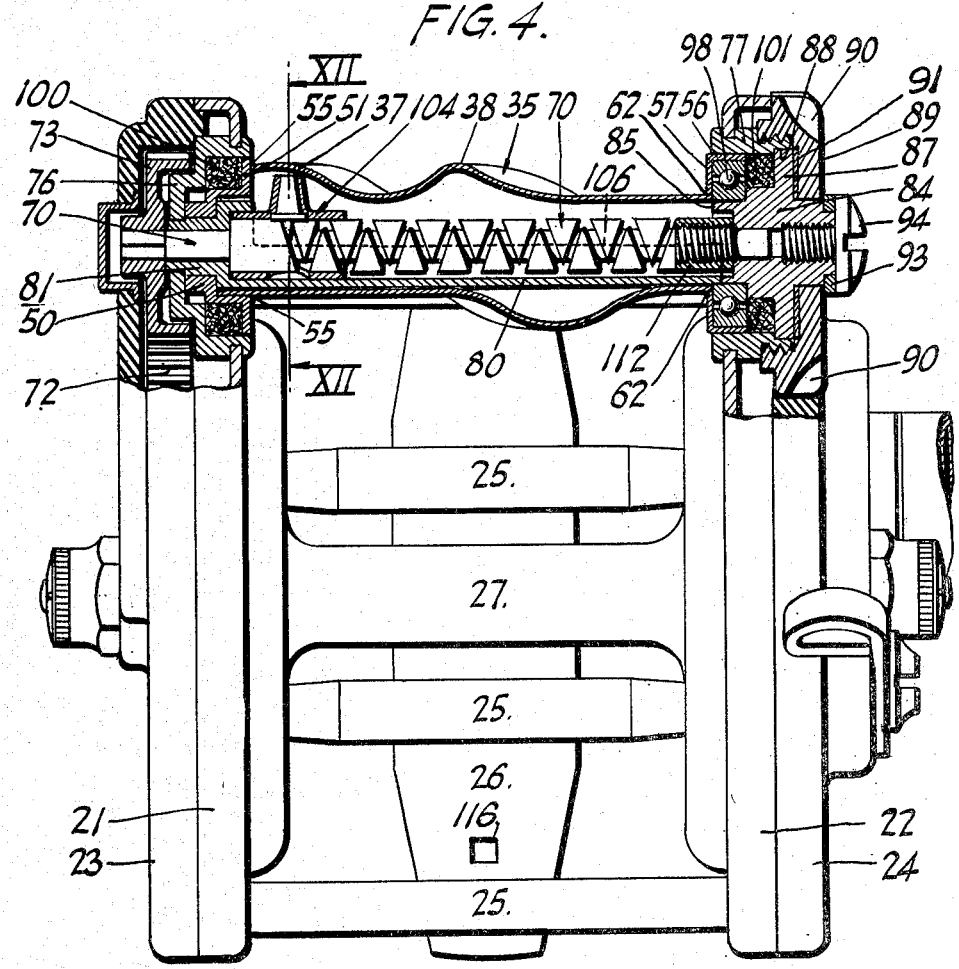
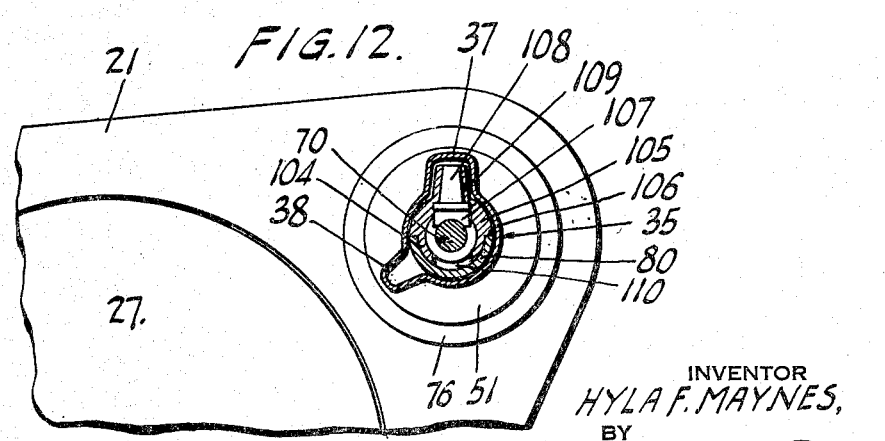

Patented Sept. 19, 1950

2,523,133

UNITED STATES PATENT OFFICE 2,523,133

FISHING REEL

Hyla F. Maynes, Miami, Fla.; Emma C. Maynes executrix of said Hyla F. Maynes, deceased Application July 23, 1946, Serial No. 685,740

20 Claims. (Cl. 242—84.4)

This invention relates to fishing reels and it has particular relation to mechanism for feeding fishing line evenly across the winding spools thereof.

My prior Patent No. 2,338,126 granted January 4, 1944, shows a line feeding means in the form of a helical shaft disposed parallel to the winding spool and having means for angularly oscillating the helical shaft in timed relation with the winding of the spool. In the aforesaid prior patent the oscillation of the level wind shaft is produced by mechanism separate and spaced from the helical level wind shaft itself.

According to the present invention the level wind shaft, while retaining its helical exterior conformation, is hollow and encloses within itself transmission means for converting the continuous rotary motion of the winding spool to the desired timed oscillation of the helical level wind shaft.

Further, in the construction of the present invention the helical conformation of the level wind shaft is utilized in the production of oscillatory movement thereof by means of a member which reciprocates therein lineally across the reel and thus engages along the interior of the helical formation of the level wind shaft to cause the latter to oscillate.

In addition to the foregoing, the arrangement of parts is such that the level wind shaft and its supporting elements completely house and seal the transmission mechanism for producing oscillatory movement of the level wind shaft against the entrance of moisture or other undesirable matter. Still further, the ultimate simplicity in external appearance achieved by disposing such transmission mechanism within the level wind shaft is accomplished without sacrificing, and in fact with enhancement of, the facility of assembly and disassembly of the mechanism.

These and other objects and advantages of the present invention, including those arising from the particular arrangement and design of the several parts of the structure, will become apparent from the following description of a specific example of the principles of the present invention, taken in conjunction with the accompanying drawings.

In the drawings:

Fig. 1 is a plan view of a surf-casting type of reel illustrated by way of example;

Fig. 2 is a side elevational view thereof;

Fig. 3 is a side elevational view thereof taken from the opposite side from Fig. 2 and with portions of the cover element broken away for added clearness;

Fig. 4 is a view similar to Fig. 1 but on a larger scale and with the level wind means shown in cross-section;

Fig. 5 is a fragmentary elevational view viewed from the left as shown in Fig. 2;

Fig. 6 is an exploded perspective view of the level wind shaft and associated elements;

Fig. 7 is an exploded perspective view of elements assembled coaxially with the level wind shaft of Fig. 6;

Fig. 8 is a fragmentary exploded perspective view of still other elements assembled coaxially with the level wind shaft of Fig. 6;

Fig. 9 is a detailed perspective view of drive means cooperating with the mechanism of Fig. 8;

Fig. 10 is a detailed end elevational view of the level wind shaft of Fig. 6;

Fig. 11 is an end elevational view of one of the elements of Fig. 7; and

Fig. 12 is a fragmentary cross-sectional view on the line XII—XII of Fig. 4.

The reel shown in the drawings by way of example has a frame comprising end members 21 and 22 provided, respectively, with cover elements 23 and 24 and connected by pillars 25. The lower pillars 25 may be joined to a saddle 26 to facilitate securement of the reel to a rod. A flanged line winding spool is designated 27 and is journaled in the frame in which it may be rotated by turning a handle 28 which is connected thereto by a gear and pinion drive indicated at 30 in Fig. 2, the gear and pinion drive being conveniently disposed between end member 22 and its cover element 24.

The present invention comprises an improvement in the construction shown in my prior Patent No. 2,338,126 dated January 4, 1944. In the aforesaid patent a level wind shaft having a generally helical formation is journaled between the end members of the reel and is provided with mechanism for angularly oscillating it to present a trough moving from side to side of the spool, in which trough the line rides to feed evenly across the spool. According to the patent enumerated, the level wind shaft is oscillated synchronously with rotation of the spool by means of a double-threaded shaft and associated mechanism likewise journaled between the end members of the reel frame. In the aforesaid patent the double-threaded screw and its related driving elements have an axis parallel to the axis of the level wind shaft but spaced therefrom, there being a gear connection between the two mechanisms which are otherwise wholly separate and independent.

According to the present invention I provide a level wind shaft 35 which likewise has a generally helical conformation but which is hollow and contains within itself all of the mechanism for translating the rotary movement of the line spool 27 to the desired synchronized oscillation of the level wind shaft.

Referring to Fig. 6 particularly, a preferred form of the level wind shaft comprises a tubular sheet metal body having a pair of helically extending ridges 37 and 38 formed therealong. Such ridges define a helically extending valley 39 which determines the transverse disposition of the line as it winds upon the spool. For instance, as viewed in Fig. 1 the line would lie in the valley at substantially the point marked 40. At one end the ridges 37 and 38 of the level wind shaft are cut off as at 44 and 45, respectively, whereby the remaining generally circular projection may enter a circular recess in a cup-shaped member 50, the ends of the ridges 37 and 38 abutting the inner face of an annular flange 51 formed on cup-shaped member 50. Permanent hermetic assembly of these two parts is completed by welding entirely about the inner face of flange 51 along the line of abutment with the tubular level wind shaft 35, as at 55 in Fig. 4.

At its opposite end level wind shaft 35 is provided with a second cup-shaped member 56 which is shown in detail in Fig. 10. The right-hand end of level wind shaft 35 has the ridges 37 and 38 cut back as previously described for the left-hand end but in this instance the cut-back is equal only to the metal thickness of the radial portion 57 of cup-shaped member 56. Such radial portion 57 is provided with a central opening 58 for receiving the circular projecting portion of the level wind shaft and is further provided with an extension 59 of opening 58 which follows the outline of the interior of the adjacent ridge 37 for a purpose which will presently appear. As in the preceding instance, level wind shaft 35 and cup-shaped element 56 are permanently and hermetically assembled by means of welding along their external line of abutment as at 62 in Fig. 4.

To facilitate an understanding of the construction of the level wind mechanism herein set forth, it may be noted that the concentric mechanism shown assembled in Fig. 4 comprises three units which have relative rotation with respect to each other. The inner of these elements comprises a double-threaded screw 70 which is gear connected to spool shaft 27 for continuous rotation therewith. This connection is shown in Fig. 3 and comprises a drive pinion 71, an intermediate idler gear 72, and a pinion 73 disposed upon a squared end of screw 70.

The second of the three concentric units may be said to be the level wind shaft 35 and the end members 50 and 56 fixed thereto. Disposed generally between double-threaded screw 70 and level wind shaft 35 are the elements shown in exploded perspective in Fig. 7. These elements, while angularly adjustable about the common axis of the level wind shaft for timing purposes, are fixed and stationary during normal reel operation.

The end members 21 and 22 have fixed thereto a pair of hub elements 76 and 77. The intermediate stationary portion of the concentric mechanism comprises a hollow semi-circular member 80, see Fig. 7, having a full circular hub portion 81 at its left end as viewed in Figs. 4 and 7. Hub portion 81 is stepped to seat snugly in a suitable bore in fixed hub element 76 of the reel frame and has a shoulder seating thereagainst. At its right end member 80 is provided with an abutting collar 84 which has an overhanging portion 85 which seats over the adjacent end of semi-circular member 80 and prevents relative rotation between the two parts. Collar 84 has an outwardly extending annular flange 87 and fixed hub element 77 has a recess 88 in its outer face which receives the periphery of flange 87.

As shown in Fig. 4, the outer end of hub element 77 is threaded to receive a nut 89 which engages indirectly against flange 87 through the medium of a resilient washer 91 and thus resiliently restrains the assembly comprising the semi-circular member 80 and collar 84. Nut 89 tightens securely against the right hand terminal portion of hub element 77. Nut 89 is preferably provided with spanner notches 90 whereby a coin or the like may be used in the field to loosen nut 89 for purposes of disassembly. The outer end of collar 84 has a flattened projection 92 which receives a pointer 93 which is fixed on projection 92 by means of a screw 94. As appears from Fig. 2, pointer 93 shows the condition of angular adjustment of member 80 through cooperation with graduations 96 on the cover element 24, such angular adjustment being resiliently retained through cooperation of washer 91.

Double-threaded screw 70 is journaled at its opposite ends in the relatively fixed assembly just described, at its left end in hub portion 81 and at its right end in collar 84. The inner end of normally fixed collar 84 is stepped to receive and support the inner race of an anti-friction bearing 98 whose outer race seats within and supports cup-shaped member 56 of level wind shaft 35. At its opposite end level wind shaft 35 is supported upon the relatively fixed hub portion 81 of semi-circular member 80, hub portion 81 and cup-shaped element 50 being complementarily stepped for this purpose.

Cup shaped element 50 and its flange 51 cooperate with an annular recess in fixed hub 76 to provide space for the reception of packing as at 100. Similarly, the anti-friction bearing 98 cooperates with collar 84, its flange 87, and the inner periphery of fixed hub 77 to define an annular space for receiving packing as at 101. The packings 100 and 101 and the mode of construction and assembly of the parts thus far described in connection with the level wind mechanism insures against the access of moisture to the level wind drive means, an important consideration in equipment of the kind here under consideration.

It will be noted the moving joint between flange 55 and hub 76 and the moving joint between the outer periphery of cup-shaped member 56 and hub 77 are the only external moving joints present in the entire level wind mechanism and these are adequately sealed by packings 100 and 101, respectively.

A tubular carriage or sleeve 104 shown in detail in Fig. 9 is slidable along double-threaded shaft 70 and has enlarged shoulders 105 at opposite sides thereof for sliding engagement along the upper edges 106 of semi-circular member 80. A pawl or key element 107 forming means for engagement in the reversely threaded groove of shaft 70 has a tapered shank 108 which fits in a tapered bore or recess in a hub 109 formed integrally with tubular element 104. The bottom wall of tubular element 104 has a clearance hole 110 to permit ready assembly and disassembly of pawl 107 with respect to carriage 104 and to facilitate machining the tapered bore which receives shank 108 of pawl 107.

As shown in Fig. 8, the right hand end of shaft 70 is threaded as at 111 to receive a round nut 112 which has flats 113 for receiving a wrench or other tool. Tubular member 104 is assembled on double-threaded screw 70 with nut 112 removed, to permit pawl 107 to be introduced into the groove in the reversely threaded screw.

The only function of ridge 38 of level wind shaft 35 is to cooperate in defining the line guide valley 39. The ridge 37, however, is formed internally in such manner as to receive hub 109 of tubular member 104 therein in such manner that hub 109 may traverse the interior of ridge 37 as hub 109 is moved to and fro across the reel through continuous rotation of reversely threaded shaft 70 through the gear connection of the latter with the line winding spool. Since shoulders 105 of carriage 104 are in continuous engagement with the edges 106 of the relatively stationary semi-circular member 80, rotation of tubular member 104 in its to and fro movement is prevented and the hub 109 rotates the level wind shaft 35 in an oscillatory or to and fro manner to move the line guiding valley thereof to and fro across the reel.

Since extraneous conditions sometimes cause the line to wind more heavily on one side or the other of the spool 27, it is desirable to provide an adjustment of the level wind shaft which will cause the line to be guided more heavily to one side of the shaft than the other to equalize such unevenness. This is accomplished by merely changing the position of pointer 93, which is shown in middle position in Fig. 2. This adjusts the angular disposition of edges 106 of semi-circular element 80 and accordingly adjusts the angular position of the arc of oscillation of level wind shaft 35.

It will be noted that the level wind drive means may be readily withdrawn through the relatively large opening in hub 77. The key or pawl element 107 and its tubular holder 104 will be withdrawn with screw 70 through the right hand end of level wind shaft 35, the hub 109 of member 104 passing through the opening 59 provided in cup-shaped element 56 as the hub leaves the end of the helical formation 37.

In Fig. 4 a square opening is indicated at 116 and this opening is proportioned to fit the squared end of double-threaded shaft 70. When the level wind shaft and its transmission mechanism have been disassembled, by withdrawing double-threaded screw 70, with tubular carriage 104 assembled therewith, through the opening in cup-shaped element 56, the squared end of screw 70 may be inserted in opening 116, whereby screw 70 is rigidly supported and nut 112 may readily be removed to permit the removal of carriage 104 from screw 70 and disassembly is completed by removal of pawl 107 from carriage 104.

When the device is in use access to tools may not be possible or convenient. For this reason it is desirable to provide means cooperating with opening 116 to effect the removal of nut 112 from screw 70. In a preferred form of my invention the cover elements 23 and 24 are molded resin and, as shown in Fig. 3, cover element 23 may be provided with a metal insert 117, preferably fixed therein during molding, with a blind recess 118 which fits nut 112. Cover element 23 may thus be used as a wrench for removing nut 112 while shaft 70 is held in opening 116.

As shown in Fig. 6, level windshaft 35 is preferably provided with conventional spring-capped means 120 to permit oiling the interior thereof, whereby all of the drive parts for the level wind shaft may be simply lubricated.

What is claimed is:

1. In a fishing reel, a frame and a spool mounted thereon for winding a fishing line, means parallel with said spool and having a helical external formation for receiving the line in contact with the surface thereof, said means being oscillatable to distribute the line across the spool during winding, a chamber within said means and an operating member adapted to engage the interior of said helical formation to cause oscillation of said means.

2. In a fishing reel, a frame and a spool mounted thereon for winding a fishing line, means parallel with said spool and having a helical external formation for receiving the line in contact with the surface thereof, said means being oscillatable to distribute the line across the spool during winding, a chamber within said means and an operating member adapted to engage the interior of said helical formation, and means for reciprocating said operating member back and forth across the reel to cause oscillation of said means.

3. In a fishing reel, a frame and a spool mounted thereon for winding a fishing line, means parallel with said spool and having a helical external formation for receiving the line in contact with the surface thereof, said means being oscillatable to distribute the line across the spool during winding, a chamber within said means and an operating member adapted to engage the interior of said helical formation, and a double-threaded screw rotatable in said chamber and engaging said operating member to reciprocate the same back and forth across the reel to cause oscillation of said means.

4. In a fishing reel, a frame and a spool mounted thereon for winding a fishing line, means parallel with said spool and having a helical external formation for receiving the line in contact with the surface thereof, said means being oscillatable to distribute the line across the spool during winding, a chamber within said means and an operating member adapted to engage the interior of said helical formation, a double-threaded screw rotatable in said chamber and engaging said operating member to reciprocate the same back and forth across the reel to cause oscillation of said means, and means connecting the spool and the double-threaded screw for timed rotation.

5. In a fishing reel, a frame and a spool mounted thereon for winding a fishing line, a rotatable member parallel with said spool and having external guiding surfaces defining a shifting guide for shifting a fishing line laterally across the spool during winding, a chamber within said rotatable member and an operating element in said chamber and engaging said member, and means for reciprocating said operating element back and forth across the reel to rotate said member.

6. In a fishing reel, a frame and a spool mounted thereon for winding a fishing line, a rotatable member parallel with said spool and having external guiding surfaces defining a shifting guide for shifting a fishing line laterally across the spool during winding, a chamber within said rotatable member and an operating element in said chamber and engaging said member, and a double-threaded screw in said chamber and engaging said operating element to reciprocate the same back and forth across the reel to rotate said member.

7. In a fishing reel, a frame and a spool mounted thereon for winding a fishing line, a rotatable member parallel with said spool and having external guiding surfaces defining a shifting guide for shifting a fishing line laterally across the spool during winding, a chamber within said rotatable member and an operating element in said chamber and engaging said member, a double-threaded screw in said chamber and engaging said operating element to reciprocate the same back and forth across the reel to rotate said member, and means connecting the spool and the double-threaded screw for timed rotation.

8. In a fishing reel, a frame and a spool mounted thereon for winding a fishing line, a level wind shaft mounted on the frame and rotatable to shift the line from end to end of the spool during winding, a chamber within said level wind shaft, and means movable therein for rotating said level wind shaft.

9. In a fishing reel, a frame and a spool mounted thereon for winding a fishing line, tubular means parallel with said spool and having a generally helical peripheral ridge for receiving the line in contact with the surface thereof, said tubular means being oscillatable to distribute the line across the spool during winding, and drive means within said tubular means adapted to engage the interior of said peripheral ridge to oscillate said tubular means.

10. In a fishing reel, a frame and a spool mounted thereon for winding a fishing line, tubular means parallel with said spool and having a cam-like peripheral ridge for guiding the line, said tubular means being oscillatable to distribute the line across the spool during winding, and drive means within said tubular means adapted to engage the interior of said peripheral ridge to oscillate said tubular means.

11. In a fishing reel, a frame and a spool mounted thereon for winding a fishing line, tubular means parallel with said spool and having a peripheral ridge for guiding the line, said tubular means being oscillatable to distribute the line across the spool during winding, and drive means within said tubular means adapted to engage the interior of said peripheral ridge to oscillate said tubular means.

12. In a fishing reel, a frame and a spool mounted thereon for winding a fishing line, tubular means parallel with said spool and having a cam-like peripheral ridge for guiding the line, said tubular means being oscillatable to distribute the line across the spool during winding, drive means within said tubular means adapted to engage the interior of said peripheral ridge, and a double-threaded screw rotatable in said tubular means and engaging said drive means to reciprocate the same and thereby oscillate said tubular means.

13. In a fishing reel, a frame and a spool mounted thereon for winding a fishing line, an oscillatable member having a helical surface formation mounted adjacent the spool, and means for oscillating said member whereby a fishing line lying thereacross is moved back and forth in level wound relation along the length of the spool, said oscillatable member having an axial chamber, drive means in said chamber for oscillating said member, and a connection between said drive means and said spool whereby the drive means operates in timed relation with the spool.

14. In a fishing reel, a frame and a spool mounted thereon for winding a fishing line, an oscillatable member having a helical surface formation mounted adjacent the spool, and means for oscillating said member whereby a fishing line lying thereacross is moved back and forth in level wound relation along the length of the spool, said oscillatable member having an axial chamber, and drive means in said chamber for oscillating said member.

15. In a fishing reel, a pair of spaced rigidly connected end members each comprising an inner wall and an outer wall and a chamber therebetween, a spool extending between said end members, and level wind means for distributing line evenly on said spool, said level wind means comprising a double-threaded screw journaled at its opposite ends in the inner walls of said end members, a hollow level wind shaft disposed about said screw and closed throughout its length, and drive means engaging said double-threaded screw and the interior of said level wind shaft to oscillate the latter upon rotation of the former, the level wind shaft having sealing relation with the inner walls of the end members whereby the entire level wind means is sealed within the level wind shaft and the chambers of the end members.

16. In a fishing reel, a frame and a spool mounted thereon for winding a fishing line, a rotatable member spaced from the spool and having external surfaces forming a shifting guide movable laterally relative to the spool, upon rotation of said member, to distribute the fishing line across the spool during winding, the rotatable member being hollow to form a chamber therein, and an operating element in the chamber engaging said member and movable laterally relative to the spool to rotate said member.

17. In a fishing reel, a frame and a spool mounted thereon for winding a fishing line, a rotatable member spaced from the spool and having external helical surfaces forming a shifting guide movable laterally relative to the spool, upon rotation of said member, to distribute the fishing line across the spool during winding, the rotatable member being hollow to form a chamber therein, and an operating element in the chamber engaging said member and oscillatable laterally to rotate said member.

18. A fishing reel according to claim 17, in which said rotatable member has an internal helical formation engaged by said operating element.

19. A fishing reel according to claim 16, comprising also a member in said chamber engaging the operating element to prevent rotation thereof while accommodating said lateral movement of the element relative to the spool, and adjustment means for rotating said last member relative to said first member.

20. A fishing reel according to claim 16, comprising also a screw in the chamber projecting from the ends of said member and rotatable to move said operating element laterally relative to the spool, and packing surrounding the screw between the frame and each end of said rotatable member.

HYLA F. MAYNES.

REFERENCES CITED

The following references are of record in the file of this patent:

UNITED STATES PATENTS

| Number | Name | Date |
|---|---|---|
| 299,614 | Borchardt | June 3, 1884 |
| 2,027,306 | Maynes | Jan. 7, 1936 |
| 2,310,654 | Sanborn | Feb. 9, 1943 |
| 2,338,126 | Maynes | Jan. 4, 1944 |